United States Statutory Invention Registration [19]

McQuillan

[11] Reg. Number: H721

[43] Published: Jan. 2, 1990

[54] PRODUCTION OF 10 MICRON DIAMETER HOLLOW CERAMIC FIBERS

[75] Inventor: Barry W. McQuillan, San Diego, Calif.

[73] Assignee: The United States of America as represented by the Secretary of the Air Force, Washington, D.C.

[21] Appl. No.: 220,136

[22] Filed: Jul. 5, 1988

[51] Int. Cl.[4] ..... B05D 3/00

[52] U.S. Cl. ..... 264/56; 264/82; 427/299; 427/372.2; 501/95

[56] References Cited

U.S. PATENT DOCUMENTS

| | | | |
|---|---|---|---|
| 3,385,915 | 5/1968 | Hamling | 264/5 |
| 3,760,049 | 9/1973 | Borer et al. | 264/57 |
| 3,795,524 | 3/1971 | Sowman | 106/65 |
| 3,950,478 | 4/1976 | Kenworthy et al. | 264/234 |
| 3,982,955 | 9/1976 | Mansmann et al. | 106/307 |
| 4,047,965 | 9/1977 | Karst | 106/65 |
| 4,102,937 | 7/1978 | Harris | 260/666 |
| 4,110,252 | 8/1978 | Smith et al. | 252/442 |
| 4,175,153 | 11/1979 | Dobo et al. | 428/398 |
| 4,267,210 | 5/1981 | Yajima et al. | 427/226 |
| 4,267,211 | 5/1981 | Yajima et al. | 427/228 |
| 4,268,278 | 5/1981 | Dobo et al. | 55/15 |
| 4,440,571 | 4/1985 | Ishikawa et al. | 55/16 |
| 4,533,508 | 8/1985 | Stevens | 264/22 |
| 4,605,588 | 8/1986 | Simpson et al. | 428/288 |
| 4,642,271 | 2/1987 | Rice | 428/698 |

OTHER PUBLICATIONS

"Deintercalation Reactions to Form Ceramic Coatings on Graphite Fibers" by B. W. McQuillan and G. H. Reynolds, Abstract, Boston, Mass., Dec. 1986.

"Growth of Alumina Fibers from Intercalated Graphite Precursor Fibers" B. W. McQuillan and G. H. Reynolds, Abstract, San Diego, Calif., Jan. 1987.

"Synthesis of Refractory Ceramic Fibers from Intercalated Graphite Fiber Precursors:" B. W. McQuillan and G. H. Reynolds, Abstract, Apr. 1987.

"Preparation of Ceramic Fibers by Conversion Intercalated Graphite Fibers" by B. W. McQuillan and G. H. Reynolds, Abstract, Pittsburgh, Pa., Apr. 1987.

*Primary Examiner*—John F. Terapane

*Assistant Examiner*—John M. Covert

*Attorney, Agent, or Firm*—Fredric L. Sinder; Donald J. Singer

[57] ABSTRACT

Hollow ceramic fibers are made by intercalating carbon fibers with a metal chloride and then heating the intercalated fibers in air to oxidize or burn off the carbon, leaving metal oxide fibers having generally the size and structure of the carbon fiber precursors. The fibers are then soaked in boric acid solution, briefly dried and heated at a high temperature to make hollow alumina fibers. The temperatures at which the boric acid soaked fibers are heated can be varied to produce different tube morphologies.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRODUCTION OF 10 MICRON DIAMETER HOLLOW CERAMIC FIBERS

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application relates to two companion applications titled PROCESS FOR MAKING COATINGS ON GRAPHITE USING INTERCALATED SPECIES, application Ser. No. 07/220,135, now U.S. Statutory Invention Registration H614, and PREPARATION OF METAL OXIDE FIBERS FROM INTERCALATED GRAPHITE FIBERS, U.S. application Ser. No. 07/217,991, both filed on the same date as this application and hereby incorporated by reference as if fully rewritten herein.

BACKGROUND OF THE INVENTION

The invention relates generally to a process for making hollow ceramic fibers, and more specifically to a process for making hollow alumina fibers from intercalated graphite fibers.

Processes for making hollow ceramic fibers are not well known in the prior art. Such fibers will, however, by very valuable in such applications as ceramic capillaries, wicks in heat pipes, gas diffusion separators, high temperature filters and battery compartment separators. Combining the traditional high heat resistance and high modulus of elasticity of ceramic fibers with a hollow configuration will stimulate those in the art to develop a variety of many other new and valuable uses for these fibers.

It is, therefore, a principal object of the present invention to provide a process for making hollow metal oxide fibers.

It is an advantage of the present invention that the process is simple to understand and to perform.

SUMMARY OF THE INVENTION

In accordance with the foregoing principles, objects and advantages the present invention provides a novel process for making hollow metal oxide fibers. The unique discovery of the present invention is that soaking low density alumina fibers, which may be made according to the teachings of the referenced co-pending applications, in a boric acid solution, then briefly drying the fibers and heating at a high temperature yields hollow alumina fibers.

Accordingly, the invention is directed to a method for making a hollow ceramic fiber, comprising the steps of providing a low density alumina fiber, soaking the alumina fiber in a sintering aide and reheating the fiber. The alumina fiber may be gamma alumina and the sintering aid may be boric acid.

The invention is also directed to a method for making a hollow ceramic fiber, comprising the steps of providing a carbon fiber, intercalating a metal chloride inside the carbon fiber, heating the intercalated carbon fiber in air to oxidize the carbon and leave a metal oxide fiber having generally the size and structure of the previous carbon fiber, followed by soaking the metal oxide fiber in a sintering aide and reheating the fiber. Aluminum chloride may be used to make the intercalated carbon fiber and boric acid may be used as the sintering aid.

The invention additionally includes heating the boric acid soaked fiber to a temperature about 1250° C. to convert the soaked fiber to a tube.

The invention also includes heating the boric acid soaked fiber to a temperature about 800° C. to convert the soaked fiber to a flattened tube.

The invention also includes a hollow ceramic fiber and a hollow alumina fiber made according to the disclosed methods.

DETAILED DESCRIPTION

Aluminum chloride ($AlCl_3$) is first intercalated into graphite fibers by standard techniques well known in the art. For example, to intercalate ($AlCl_3$) into tows of Union Carbide P-100 fiber, the fibers are heated at ~300° C. in air to remove any sizing. The fibers are then placed inside a Pyrex tube to which the aluminum chloride and chlorine gas ($Cl_2$) are added. The $Cl_2$ is frozen in the tube and the tube sealed under vacuum. The sample is next heated to generate a sufficient vapor pressure of aluminum chloride. After 1–3 days, the tube is cooled and opened in a drybox. The added $AlCl_3$ and $Cl_2$ will generally be sufficient to produce $C_n+AlCl_4-(n\sim36)$ in-between the crystalline layers comprising the graphite fibers.

The intercalated fibers are then heated in air to 800° C. Within 1–3 hours, all the graphite burns off leaving a light and flexible oxide fiber tow. The individual fibers are visibly similar to the original P-100 fibers, including having a layered metal oxide microstructure along the previous layer planes. X-ray diffraction shows the fibers to be gamma alumina ($\gamma$-$Al_2O_3$), with no obvious preferred orientation. The fiber has a lower than expected density, ~0.6 g/cc compared to ~3.9 g/cc for a fully dense material. This loss of density, or porosity, is assumed to be due to escaping $CO_2$ and $Cl_2$ as the graphite fiber is oxidized at 800° C.

Cross-referenced companion application Ser. No. 07/217,991, Preparation of Metal Oxide Fibers from Intercalated Graphite Fibers, describes densifying the fibers by heating to achieve a phase change. Another means for densifying materials is sintering. Applicants have discovered that, surprisingly, using boric acid as a sintering aide to densify thus made alumina fibers results in the production of alumina tubes. Soaking the gamma $Al_2O_3$ tows in $10^{-3}$ M $H_3BO_3$ for ~12 hours, briefly drying at 150° C. and then heating the tows to 1250° C. for ~12 hours converts the gamma fibers to alpha $Al_2O_3$ tubes. The hollow fibers are ellipsoidal, with major and minor axis of 5 and 10 $\mu$m respectively. The wall thickness is 1–2 $\mu$m. The tubes appear hollow for long distances (>100 $\mu$m). Some of the fibers are cracked open far from the points of fracture and some have holes in their walls. X-ray diffraction of hollow tubes produced by this process indicates only alpha $Al_2O_3$, with the same preferred orientation as the merely reheated fibers described in applicant's cross-referenced companion application.

Gamma $Al_2O_3$ fibers dipped in $10^{-2}$ M $H_3BO_3$ and heated to 1250° C. have the same hollow structure and $Al_2O_3$ pattern as those treated with $10^{-3}$ M $H_3BO_3$. Gamma $Al_2O_3$ dipped in $10^{-2}$ M $H_3BO_3$ and heated to 800° C. assumes the shape of very flattened tubes. The reasons for the different morphologies with different heat treatments are unclear.

Those with skill in the art will also see that further experimentation with different pressures and temperatures will lead to a variety of other morphologies and structures.

The disclosed process successfully demonstrates making hollow alumina tubes from alumina fibers. Although the disclosed process is specialized, extension of its underlying methodology will find application in other areas where specially shaped fibers and other materials are desired. Other low density fibers, such as those taught in the cross-referenced companion applications, may be similarly densified to produce hollow fibers.

It is understood that other modifications to the invention as described may be made, as might occur to one with skill in the field of the invention. Therefore, all embodiments contemplated have not been shown in complete detail. Other embodiments may be developed without departing from the spirit of the invention or from the scope of the claims.

We claim:

1. A method for making a hollow ceramic fiber, comprising the steps of:

(a) providing a low density ceramic fiber;

(b) soaking the ceramic fiber in a sintering aide; and, (c) heating the fiber to make a hollow ceramic fiber.

2. The method according to claim 1, wherein the ceramic fiber is gamma alumina.

3. The method according to claim 1, wherein the sintering aid is boric acid.

4. A method for making a hollow metal oxide fiber, comprising the steps of:

(a) providing a graphitic carbon fiber;

(b) intercalating a metal chloride inside the carbon fiber;

(c) heating the intercalated carbon fiber to oxidize the carbon and leave a low density metal oxide fiber having generally the size and structure of the carbon fiber precursor;

(d) soaking the metal oxide fiber in a sintering aide; and, (e) reheating the fiber to make a hollow metal oxide fiber.

5. A method for making a hollow alumina fiber, comprising the steps of:

(a) providing a carbon fiber;

(b) intercalating aluminum chloride inside the carbon fiber;

(c) heating the intercalated carbon fiber to oxidize the carbon and leave a low density alumina fiber having generally the size and structure of the carbon fiber precursor;

(d) soaking the alumina fiber in a sintering aide; and (e) reheating the fiber to make a hollow alumina oxide fiber.

6. The method according to claim 5, wherein the sintering aid is boric acid.

7. The method according to claim 6, wherein the boric acid soaked fiber is heated to a temperature about 1250° C. to convert the soaked fiber to a tube.

8. The method according to claim 6, wherein the boric acid soaked fiber is heated to a temperature about 800° C. to convert the soaked fiber to a flattened tube.

* * * * *